Jan. 9, 1968     H. FROITZHEIM ET AL     3,362,316

FLOOR MAT WITH VENTILATING APERTURE FOR VEHICLES

Filed Nov. 26, 1965

INVENTORS
HANS FROITZHEIM
KARL LETZEL

BY *Dicke + Craig*

ATTORNEYS

United States Patent Office 3,362,316
Patented Jan. 9, 1968

3,362,316
FLOOR MAT WITH VENTILATING APERTURE FOR VEHICLES
Hans Froitzheim and Karl Letzel, Sindelfingen, Wurttemberg, Germany, assignors to Daimler-Benz Aktiengesellschaft, Stuttgart-Unterturkheim, Germany
Filed Nov. 26, 1965, Ser. No. 509,855
Claims priority, application Germany, Nov. 27, 1964,
D 45,929
4 Claims. (Cl. 98—2)

ABSTRACT OF THE DISCLOSURE

A unitary floor cover subassembly for motor vehicles, especially for motor vehicles having air inlet apertures in the pedal floor for supplying fresh air to the interior of the driver's compartment, said subassembly comprising an upper elastic plate, a lower barrier layer foamed in situ to form a bond with said elastic plate and a grid plate, which is aligned with aligned apertures in said elastic plate and barrier layer, said grid plate having an area larger than the apertures in said barrier layer and said elastic plate, wherein the outer portion of said grid plate is secured between said elastic plate and said barrier layer by the foamed in situ bond formed between these two elements.

---

Figure 1:
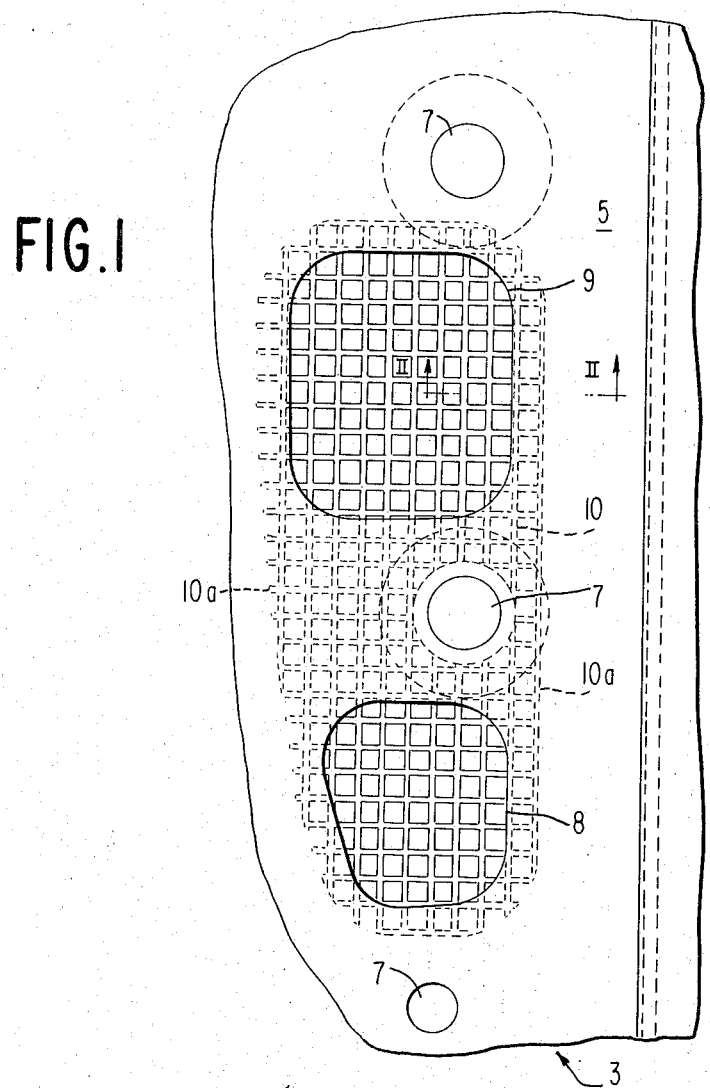

The present invention relates to an improved and advantageous construction of the protective cover for the pedal floor as disclosed in the co-pending application Ser. No. 394,675 filed on Sept. 8, 1965 in the name of Hans Froitzheim and assigned to the assignee of the present application, issued on Nov. 8, 1966 as U.S. Patent No. 3,283,692, the subject matter of this co-pending application being incorporated herein by reference to the extent necessary. In this co-pending application, there is described an inlet aperture for fresh air which is provided in the pedal floor of vehicles for the ventilation of the driver cab; this air inlet aperture may be selectively opened and closed as described in this co-pending application. For this purpose, the pedal floor is provided with an aperture adapted to be closed by a valve or flap from below, which aperture is covered on top thereof by a screen or grid-like structure. The two-layered protective cover of the pedal floor is thereby also interrupted and apertured approximately at the same size and dimension as the pedal floor aperture whereby the grid plate of the cover which is inserted in particular between an outer rubber plate and a barrier layer foamed onto the bottom side of the rubber plate, covers the aperture. Screws thereby connect the grid plate with the protective cover and the protective cover with the pedal floor in this prior application.

The floor cover according to the present invention, with the simultaneous elimination of the costly threaded connection of the grid plate, forms a mat ready for use as unit by the simultaneous foaming-in of the grid-plate during the foaming-on of the barrier layer to the bottom of the rubber plate. In this manner, a rigid and neat connection of the different cover parts into a unitary cover having the predetermined apertures is achieved and considerable savings in the manufacture are attained thereby.

Accordingly, it is an object of the present invention to provide a floor mat for motor vehicles of the type described above which is simple in construction, relatively inexpensive to manufacture, and reliable for its intended purposes.

Another object of the present invention resides in the provision of a floor mat representing a ready-for-use unitary structure which obviates the need for a threaded connection of the various component parts.

A further object of the present invention resides in the provision of a floor cover composed of an outer plate, a foamed-in bottom layer and a grid plate interposed therebetween for covering ventilation inlet apertures provided in the vehicle floor, which cover can be readily manufactured without great expeditures and offers a neat appearance.

Figure 2:
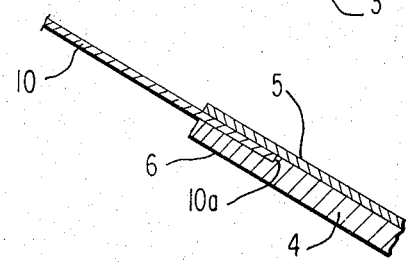

These and other objects, features and advantages of the present invention will become more obvious from the following description when taken in connection with the accompanying drawing which shows, for purposes of illustration, one embodiment in accordance with the present invention, and wherein:

FIGURE 1 is a partial plan view on the inclined pedal floor provided with a pedal floor cover in accordance with the present invention; and FIGURE 2 is a cross-sectional view, taken along line II—II of FIGURE 1.

Referring now to the drawing, wherein like reference numerals are used throughout the two views to designate like parts, reference numeral 3 generally designates therein the cover for the pedal floor which essentially consists of a two-layered mat 4 composed of a rubber plate 5 or similar elastic material and of a bottom barrier layer 6 foamed to the underside of the rubber plate 5. The mat 4 is provided with several apertures 7 for the extension therethrough of the actuating levers (not shown). Additionally, the mat 4 is provided with two larger apertures 8 and 9 which are disposed within the area of the large aperture of the pedal floor for the supply of fresh air. The two larger apertures 8 and 9 of the mat 4 are covered by a screen or grid plate 10 which overlap sufficiently the rims of the apertures 8 and 9.

The screen or grid plate 10 is inserted between the rubber plate 5 and the barrier layer 6. The grid plate 10 is foamed-in simultaneously with the foaming-in operation of the barrier layer 6 to the underside of the rubber plate 5 (FIGURE 2). As a result thereof, the mat 4 consisting of the rubber plate 5 and of the foamed-in barrier layer 6 forms together with the grid plate 10 secured between the two layers 5 and 6 a cover unit ready for use. The cover made in this manner is bonded, cemented or glued by conventional means at the bottom side thereof to the pedal floor.

In this manner, the manufacturing costs of the pedal floor cover are reduced in an advantageous manner. A tearing-out of the screen or grid plate 10 at the rim under extreme loads is prevented by the securing surfaces 10a provided at the rims of the apertures 8 and 9. The securing surfaces 10a overlap the aperture rims to a sufficient extent and assure thereby an effective and secure connection of the grid plate 10 with the mat 4.

While we have shown and described one embodiment in accordance with the present invention, it is understood that the same is not limited thereto but is susceptible of numerous changes and modifications as known to a person skilled in the art and we therefore do not wish to be limited to the details shown and described herein but intend to cover all such changes and modifications as are encompassed by the scope of the appended claims.

We claim:
1. A unitary floor cover subassembly for motor vehicles, especially for motor vehicles having apertures in the pedal floor thereof for providing a supply of fresh air to the interior of the driver's compartment, comprising:
   elastic plate means having at least one aperture therein,
   barrier layer means, having at least one aperture therein and disposed underneath said elastic plate means and bonded thereto such that an aperture therein is aligned with a corresponding aperture of said elastic plate means, and grid plate means, having an area larger than the portion of said barrier layer means and said elastic plate means which includes said apertures and being positioned in alignment therewith, the outer portion of said grid plate means being secured between said barrier layer means and said elastic plate means by means of the bond between said barrier layer means and said elastic plate means in the interstices of said grid plate means.

2. A combination according to claim 1, wherein said barrier layer means consists essentially of a foamed material and said bond between said barrier layer means and said elastic plate means is a foamed in situ bond.

3. A combination according to claim 1, further comprising a pedal floor having at least one ventilating aperture therein, the underside of said barrier layer means being bonded to said pedal floor such that said grid plate means is aligned with said ventilating apertures of said pedal floor.

4. A combination according to claim 1, wherein said grid plate means is held in place exclusively by means of the bond between said barrier layer means and said elastic plate means.

References Cited
UNITED STATES PATENTS

| | | | |
|---|---|---|---|
| 2,505,554 | 4/1950 | Kravitz | 161—109 |
| 2,628,928 | 2/1953 | Cadous | 161—112 |
| 3,007,205 | 11/1961 | House | 161—89 |
| 3,172,072 | 3/1965 | Willy. | |

MEYER PERLIN, *Primary Examiner.*